(12) United States Patent
Leigh et al.

(10) Patent No.: US 10,983,279 B2
(45) Date of Patent: Apr. 20, 2021

(54) OPTICAL SIGNAL FILTERING

(71) Applicant: HEWLETT PACKARD ENTERPRISE DEVELOPMENT LP, Houston, TX (US)

(72) Inventors: Kevin Leigh, Houston, TX (US); John Norton, Houston, TX (US); Wayne Victor Sorin, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 193 days.

(21) Appl. No.: 16/318,071

(22) PCT Filed: Jul. 18, 2016

(86) PCT No.: PCT/US2016/042723
§ 371 (c)(1),
(2) Date: Jan. 15, 2019

(87) PCT Pub. No.: WO2018/017037
PCT Pub. Date: Jan. 25, 2018

(65) Prior Publication Data
US 2020/0371289 A1 Nov. 26, 2020

(51) Int. Cl.
*G02B 6/14* (2006.01)
*G02B 6/36* (2006.01)

(52) U.S. Cl.
CPC ............. *G02B 6/14* (2013.01); *G02B 6/3616* (2013.01)

(58) Field of Classification Search
None
See application file for complete search history.

(56) References Cited

U.S. PATENT DOCUMENTS

| 4,389,090 | A | * | 6/1983 | LeFevre | G02B 6/105 359/489.07 |
| 4,721,351 | A | | 1/1988 | Goepfert | |
| 4,909,583 | A | * | 3/1990 | Williams, III | G02B 6/14 385/28 |
| 5,768,464 | A | * | 6/1998 | Leonard | G02B 6/241 385/139 |
| 5,825,489 | A | | 10/1998 | Lagakos | |
| 5,894,540 | A | * | 4/1999 | Drewing | G02B 6/444 385/135 |
| 5,895,005 | A | | 4/1999 | Simchock | |

(Continued)

FOREIGN PATENT DOCUMENTS

DE 3411272 A1 * 10/1985
JP 11-094695 4/1999

OTHER PUBLICATIONS

Bruce Robertson, 4: Modal Distributions & CPR, 2003, Kingfisher International, 4 pps, <http://www.kingfisherfiber.com/Application-Notes/04-Multimode-Modal-Distribution.aspx>.

(Continued)

*Primary Examiner* — Michael Stahl
(74) *Attorney, Agent, or Firm* — Hewlett Packard Enterprise Patent Department

(57) ABSTRACT

An example block assembly for optical signal filtering is provided herein. The block assembly includes a base with at least one aperture to receive a mandrel in a plurality of adjustable positions and orientations relative to an axis of the base. The block assembly also includes a first member and a second member extending from the base.

6 Claims, 6 Drawing Sheets

(56) References Cited

U.S. PATENT DOCUMENTS

| | | | | |
|---|---|---|---|---|
| 5,913,006 | A * | 6/1999 | Summach | G02B 6/4471 385/134 |
| 6,175,079 | B1 * | 1/2001 | Johnston | G02B 6/4452 174/50 |
| 6,398,149 | B1 * | 6/2002 | Hines | A47B 21/06 242/388.6 |
| 6,496,301 | B1 * | 12/2002 | Koplow | G02B 6/14 359/337 |
| 6,533,205 | B1 * | 3/2003 | Kles | B65H 54/58 242/362 |
| 6,571,047 | B1 * | 5/2003 | Yarkosky | G02B 6/4452 385/135 |
| 6,674,941 | B2 | 1/2004 | Tatum et al. | |
| 7,266,180 | B1 | 9/2007 | Saunders | |
| 7,627,223 | B1 * | 12/2009 | Burek | G02B 6/4457 385/134 |
| 9,036,137 | B2 | 5/2015 | Goldstein | |
| 2002/0146228 | A1 * | 10/2002 | Afflerbaugh | G02B 6/0218 385/135 |
| 2002/0163688 | A1 | 11/2002 | Zhu et al. | |
| 2003/0026566 | A1 | 2/2003 | Diep et al. | |
| 2003/0185269 | A1 | 10/2003 | Gutin | |
| 2004/0208216 | A1 | 10/2004 | Naone et al. | |
| 2005/0013539 | A1 | 1/2005 | Chen et al. | |
| 2006/0237377 | A1 * | 10/2006 | Smith | G02B 6/4452 211/26 |
| 2008/0219307 | A1 | 9/2008 | Birkedal et al. | |
| 2009/0262765 | A1 | 10/2009 | Chang et al. | |
| 2011/0318003 | A1 | 12/2011 | Brooks | |
| 2014/0119397 | A1 | 5/2014 | Whitney et al. | |
| 2015/0071638 | A1 | 3/2015 | Heroux et al. | |
| 2015/0205062 | A1 | 7/2015 | Collins et al. | |
| 2016/0202418 | A1 | 7/2016 | Fortin et al. | |

OTHER PUBLICATIONS

Haglund E.; "Quasi-single Mode VCSELs for Longer-reach Optical Interconnects"; Aug. 2013; 68 pages.

PCT/ISA/KR, International Search Report and Written Opinion, dated Dec. 8, 2016, PCT/US2016/025591, 15 pages.

PCT/ISA/KR, International Search Report, dated Jan. 17, 2017, PCT/US2016/042723.

Tian Z. et al.; "850-nm VCSEL Transmission Over Standard Single-mode Fiber Using Fiber Mode Filter"; Mar. 1, 2012; 3 pages.

International Search Report and Written Opinion received for PCT Patent Application No. PCT/US16/25591, dated Dec. 8, 2016, 13 pages.

International Search Report and Written Opinion received for PCT Patent Application No. PCT/US2016/042723, dated Jan. 17, 2017, 10 pages.

Wikipedia, "Mandrel wrapping", available online at <https://en.wikipedia.org/w/index.php?title=Mandrel_wrapping&oldid=582462047 >, Nov. 20, 2013, 2 pages.

* cited by examiner

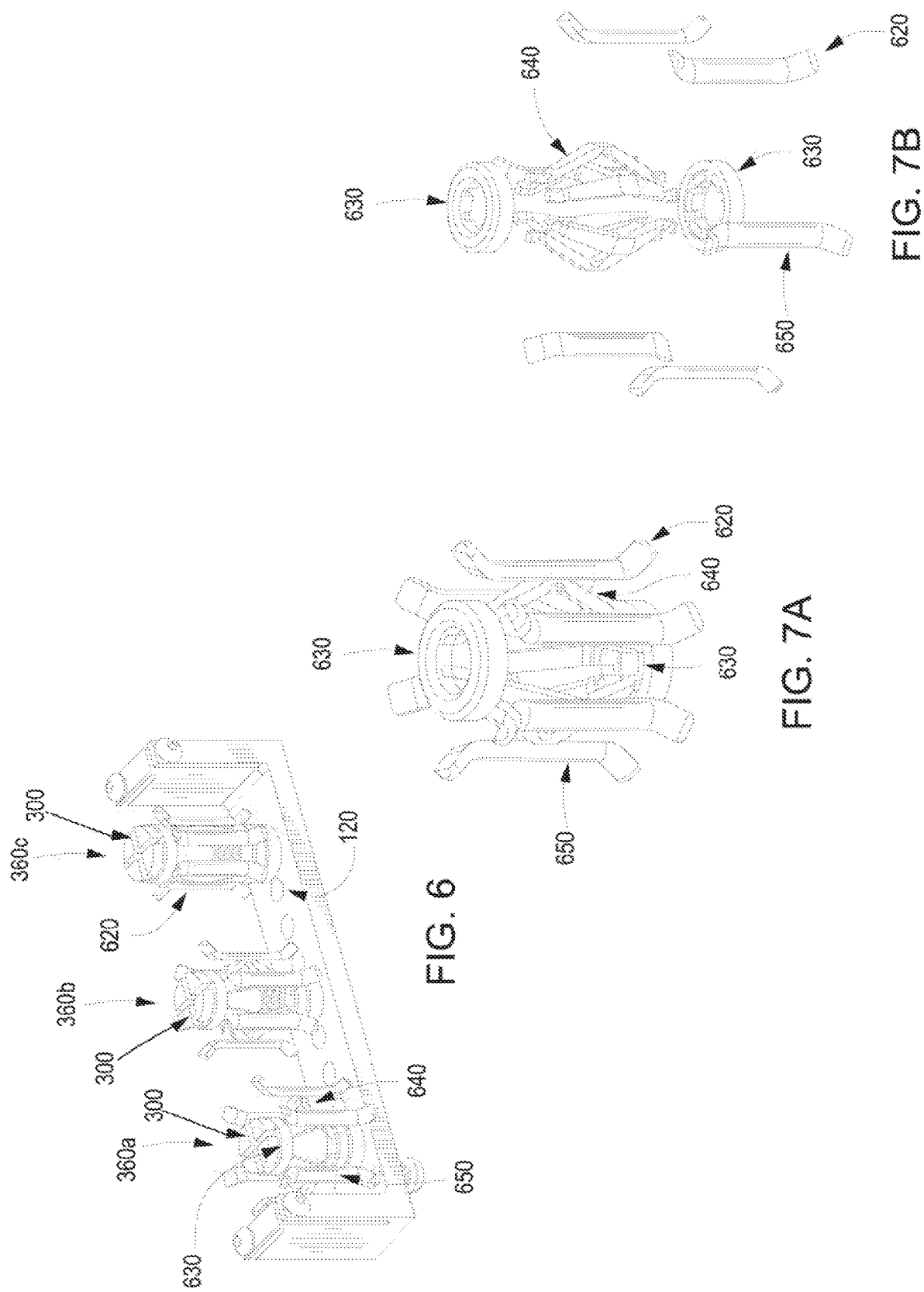

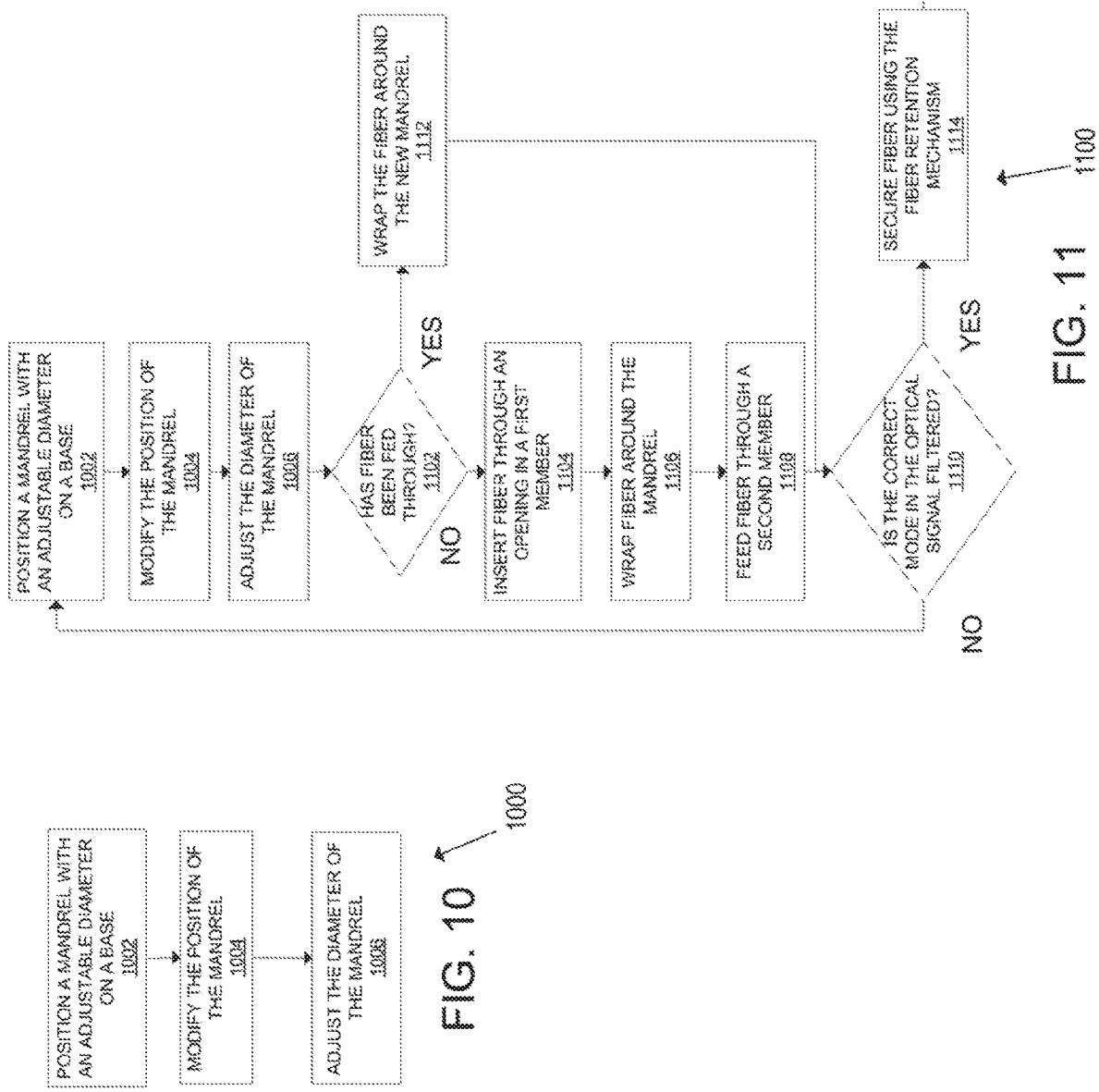

OPTICAL SIGNAL FILTERING

BACKGROUND

Optical fibers and optical connectors are used in data communication systems. Optical fiber connectors may introduce unwanted higher order optical signal modes in optical signals traveling within optical fibers. A current method to eliminate the unwanted higher order optical signal mode is to wrap the optical fiber around an individual mandrel. A mandrel is a small cylindrical shaped spool and is available in varying fixed sizes. The unwanted higher order optical signal mode can be filtered out depending on the diameter of the mandrel, the point in the length of the optical fiber where the mandrel is located with respect to an optical transceiver in a data communication system, and the number of turns the optical fiber is wrapped around the mandrel.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

FIG. 6 illustrates a schematic view of the system of FIG. 5 according to an example;

FIG. 7A illustrates a schematic view of the adjustable diameter mandrel of FIG. 6 according to an example;

FIG. 7B illustrates an exploded view of the adjustable diameter mandrel of FIG. 6 according to an example;

FIGS. 10-11 illustrate methods for optical signal filtering according to examples.

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

A system using any length of an optical fiber may include unwanted higher order optical signal modes in the optical signal when the optical fiber is connected to another optical fiber using an optical connector. A single mode optical signal travels in the core of an optical fiber. Optical connectors are attached to the ends of the optical fiber. This allows the optical fiber to connect, via another optical connector, to another optical fiber or an optical transceiver. When two optical connectors are coupled, the core of the optical fiber may not be perfectly aligned with the other optical fiber or optical transceiver. Misalignment may be the cause of the unwanted higher order optical signal. The unwanted higher order optical signal distorts the optical signal.

One common practice to passively filter out unwanted higher order optical signal modes is to wrap optical fiber around mandrels. The optical fiber may be wrapped around the mandrel multiple turns, which can eliminate the unwanted higher order optical signal mode. The mandrels used are fixed in diameter and misalignment can occur when the optical fiber is connected to a system. Mandrels can also be used in sequence along optical fiber, although consistency is hard to achieve as mandrels are placed at varying lengths along the optical fiber. It can be difficult to place mandrels in a system in the exact location where mandrels were placed in another system to produce the same results.

Practices to address unwanted higher order optical signal modes in optical signals center around multiple mandrels, different types of mandrels, or a combination of multiple and different types of mandrels. A block assembly is provided herein. The block assembly includes a first member and a second member extending from a base. The base has an aperture which receives a mandrel. Multiple mandrels may be placed in series on the base. The mandrels that are being used will allow for quick filtering and provide ease of adjustability. In examples, mandrels are placed in series. The mandrels include an adjustable diameter and orientation. The mandrels can also be adjusted in relative positions as to how they are placed in series along the optical fiber length. Once optical fiber is wrapped around a mandrel, the optical fiber is usually not secure in any way. External force may prevent the filtering of the unwanted higher order optical signal modes in the optical signal. Mechanisms for optical fiber retention and protective coverings may be provided.

Figure 1:
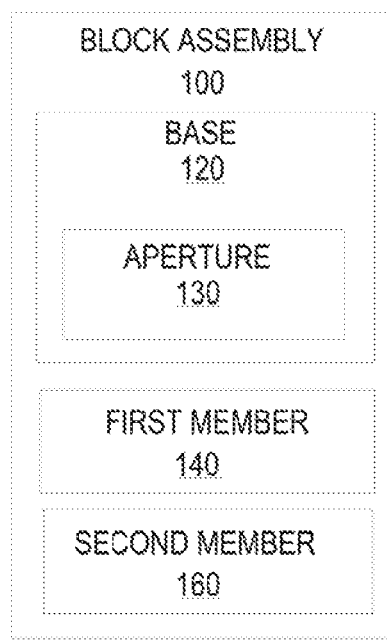
FIG. 1 illustrates a block diagram of a block assembly for optical signal filtering according to an example.

FIG. 1 illustrates a block diagram of a block assembly 100 for optical signal filtering according to an example. The block assembly 100 includes a base 120, a first member 140, and a second member 160. The first member 140 and second member 160 extend from the base 120. The base 120 includes at least one aperture 130 to receive a mandrel. The mandrels position and orientation can be adjusted in relation to the axis of the base 120.

Figure 2:
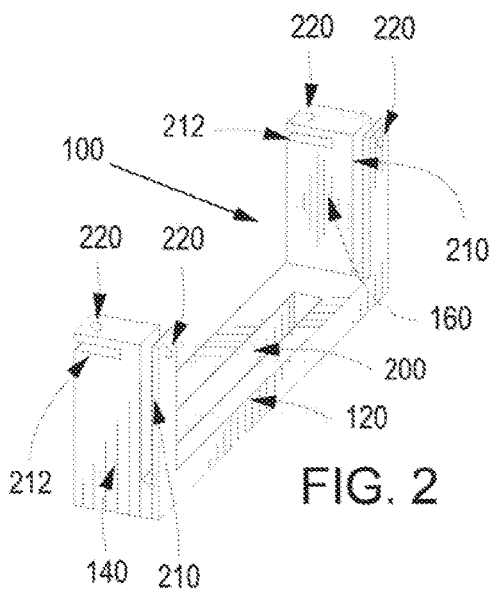
FIG. 2 illustrates a schematic view of a block assembly of FIG. 1 according to an example.

FIG. 2 illustrates a schematic view of the block assembly 100 of FIG. 1 according to an example. The base 120, first member 140, and second member 160 can be formed from any material and can be of varying sizes, depending on the optical fiber used. The aperture 130 in the base 120 may be made of a variety of apertures 130, such as multiple fixed position openings or a channel 200 spanning the length of the base 120. The base 120 is illustrated to include a channel 200 spanning the length of the base 120. The channel 200 may have features, such as notches, to allow multiple fixed positions. Mandrels added to the base 120 may slide along the channel 200 and may be adjustably positioned along the base 120. Multiple mandrels can be connected or plugged into the channel 200. The orientation of the mandrel relative to the base 120 can be adjusted. The mandrel may also have an adjustable diameter.

The first member 140 and second member 160 are illustrated as two planar surfaces extending from the base 120. Optical fiber can be fed through the first member 140, wrapped around the mandrels, and then fed through the second member 160. A vertical opening 210 and a horizontal opening 212 are illustrated in the first member 140 and the second member 160. The optical fiber may be fed through either the vertical opening 210 or the horizontal opening 212 of the first member 140 and the second member 160, according to the orientation of the mandrel. The vertical opening 210 and the horizontal opening 212 are formed to allow a flat, ribbon shape group of optical fibers, but can be formed to allow a round shape group of optical fibers. Near the ends of the vertical opening 210 and the horizontal opening 212 are round apertures 220. These round apertures 220 within the vertical opening 210 and the horizontal opening 212 are for a screw or other retention mechanism to secure the optical fiber. Other optical fiber retention mechanisms may be used. The optical fiber retention mechanism allows for strain relief, so the optical fiber will stay secure when moved or when connected to a system.

Figure 3:
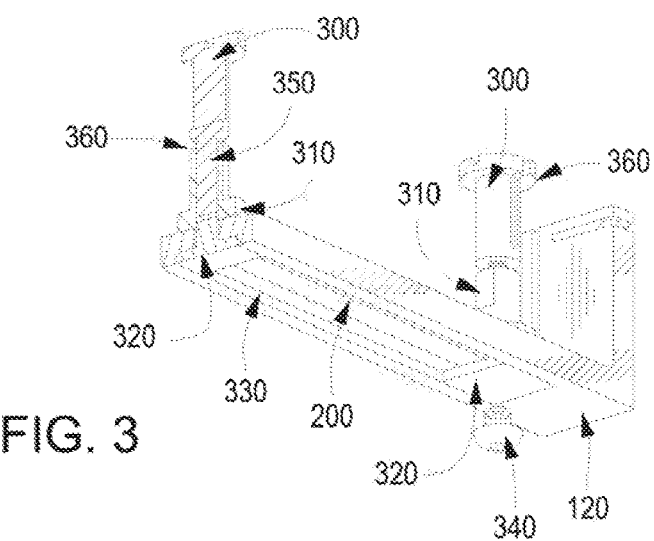
FIG. 3 illustrates a cross-sectional view of a portion of the block assembly of FIG. 1 according to an example.

FIG. 3 illustrates a cross-sectional view of a portion of the block assembly 100 of FIG. 1 according to an example. The example contains two mandrels 360 with a vertical orientation. The mandrels 360 are composed of a top member 300 with a threaded end 350. The threaded end 350 screws into a bottom member 310. The threaded end 350 and the design of the top member 300 allows use of a screwdriver or thumbscrew to adjust the mandrel 360. The block assembly 100 with a channel 200 also includes a lock mechanism, illustrated as a T shaped component 320 that can connect to the bottom member 310, locking the bottom member 310 in place on the channel 200. From a top view perspective of the base 120, the channel 200 is a narrow opening. From a bottom view perspective, the channel 200 is shown as a wider opening 330 with an indent, enabling the T shaped component 320 to fit flush into the bottom of the base 120. The base 120 has openings for screws 340 or other attachment mechanisms that allow the block assembly 100 to be secured to other objects, like a rack or printed circuit board (PCB). The base 120, the mandrel 360 and the PCB may have markings to allow repeatable configurations.

Figure 4:
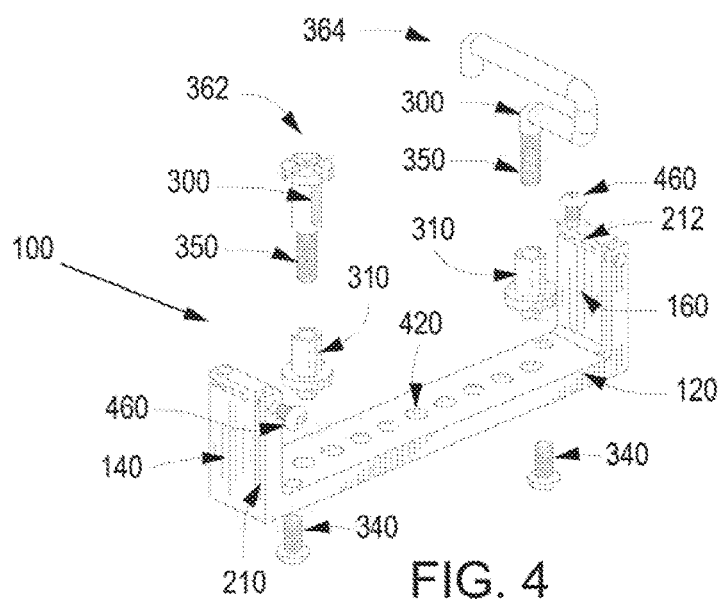
FIG. 4 illustrates an exploded view of a block assembly of FIG. 1 according to an example.

FIG. 4 illustrates an exploded view of a block assembly 100 of FIG. 1 according to an example. Two mandrels 362, 364 are illustrated, one mandrel 362 with a vertical orientation and the other mandrel 364 with a horizontal orientation. The base 120 of the block assembly 100 contains fixed position apertures 420, allowing mandrels 362, 364 to be placed in any aperture 420 along the base 120. The mandrels 362, 364 are composed of a top member 300 with a threaded end 350 and a bottom member 310. The bottom member 310 plugs into the aperture 420. Optical fiber is fed through the vertical opening 210 in the first member 140, wrapped around the vertical mandrel 362 and adjusted as necessary. The optical fiber is wrapped around the horizontal mandrel 364, fed through the horizontal opening 212 in the second member 160 and adjusted as necessary. Once adjustments are finished, the screws 460 in the first member 140 and second member 160 are tightened, securing the optical fiber in place.

Figure 5:
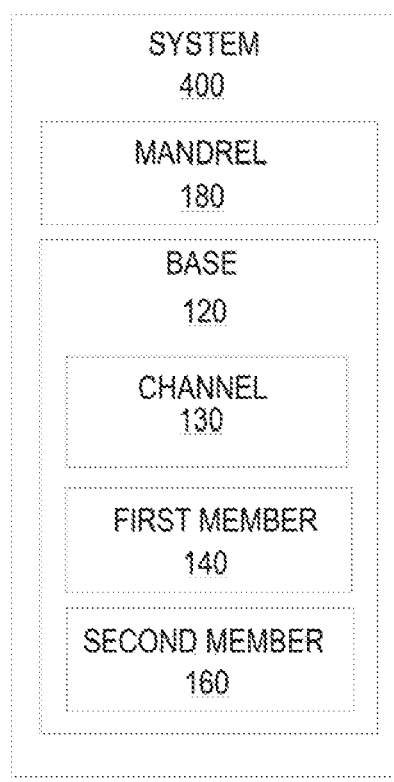
FIG. 5 illustrates a block diagram of a system for optical signal filtering according to an example.

FIG. 5 illustrates a block diagram of a system 500 for optical signal filtering according to an example. The system 500 contains a mandrel 360 with an adjustable diameter and a base 120. The base 120 includes a channel 200. The channel 200 receives the mandrel 360 in a plurality of positions relative to the axis of the base 120. The base 120 includes a first member 140 and a second member 160. The first member 140 and the second member 160 extend from the base 120 and at least one of the first member 140 and the second member 160 include an optical fiber retention mechanism.

FIG. 6 through 7B illustrates a schematic and exploded views of the system 500 of FIG. 5 according to examples. Three adjustable diameter mandrels 360 are disposed on the base 120 of the system 500. The base 120 may include prefixed apertures 420, as in FIG. 4, or a channel 200, as in FIG. 2-3. The mandrels 360 illustrated in FIG. 6 have an adjustable diameter. The mandrels 360 are composed similarly to the mandrels referred to in the previous figures. An adjustable member 620, as shown in FIGS. 7A and 7B, is added allowing the mandrels 360 diameter to change dynamically. The adjustable member 620 includes two opposing rings 630 connected by a plurality of flexible elbows 640. An optical fiber support bar 650 is connected to each flexible elbow 640. As optical fiber is wrapped around the optical fiber support bars 650, the optical fiber support bars 650 support the optical fiber wrapped around the adjustable member 620. The optical fiber support bars 650 ensure that the optical fiber will not slide off the top and bottom end of the adjustable member 620. The diameter of the mandrels 360 may be adjusted by turning the top member 300. As the top member 300 is turned clockwise, the two opposing rings 630 of each adjustable member 620 are compressed, increasing the diameter of the adjustable member 620, as the flexible elbows 640 bend outwards. As the top member 300 is turned counter-clockwise, the two opposing rings 630 of each adjustable member 620 are decompressed, decreasing the diameter of the adjustable member 620, as the flexible elbows 640 are straightened. FIG. 6 illustrates a first mandrel 360a with a larger diameter, a second mandrel 360b with a smaller diameter, and a third mandrel 360c with the smallest diameter. The top member 300 and the two opposing rings 630 may have markers for repeatable configurations.

Figure 8:
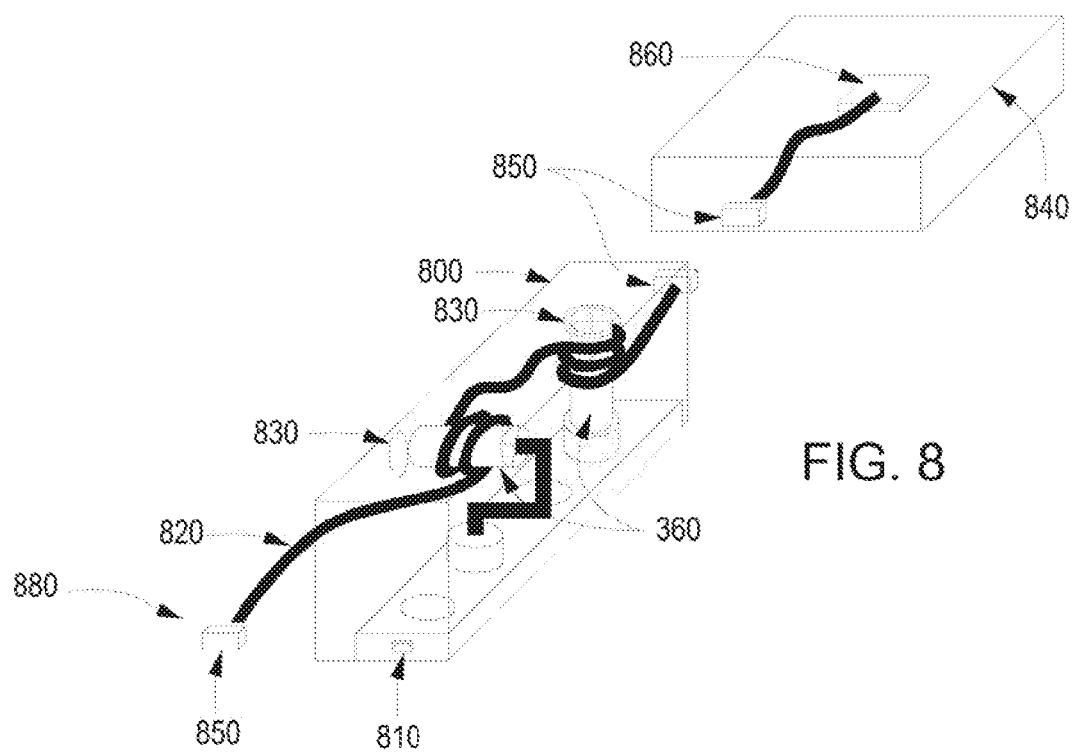
FIGS. 8-9 illustrate schematic views of the system of FIG. 5 according to examples.
Figure 9:
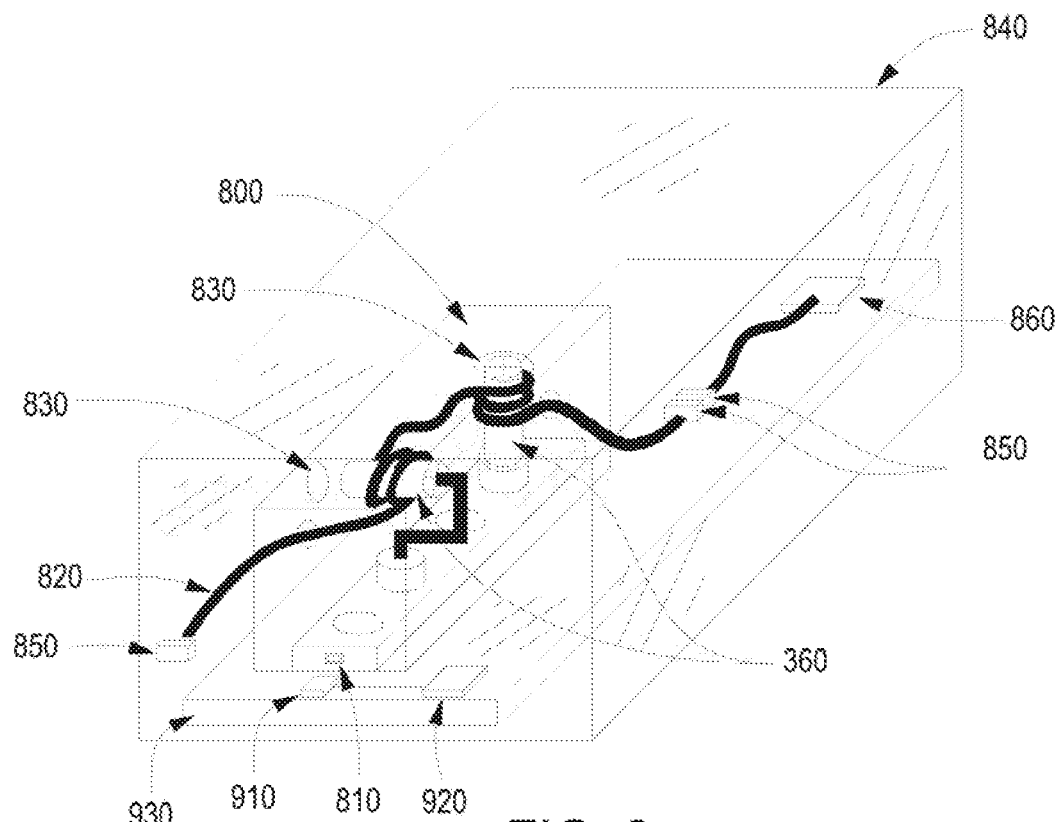

FIGS. 8 and 9 illustrates a schematic view of the system 500 of FIG. 5 according to an example. Optical fiber 820 is fed through the system 500 and the optical fiber 820 is wrapped around mandrels 360 to filter out the unwanted higher order optical signal modes, then a protective covering 800 may be placed over the system 500. The protective covering 800 may have openings 830 that align with the mandrels 360, have a removable lid, or be entirely removable. The protective covering 800 may have an embedded radio-frequency identification (RFID) tag 810. The RFID tag 810 may contain information on the type of optical fiber, number of mandrels 360, and configurations of the mandrels 360 in the system 500. Part numbers, manufacturer, and manufacturing dates may also be included in the RFID tag 810. The RFID tag 810 may be read using a common RFID tag reader. The system 500 may be external to a computer system 840, as in FIG. 8. The optical fiber 820 that is fed through the system 500 is connected to the computer system 840 via optical fiber connectors 850 on one end and may be connected to another optical fiber on the other end 880. The optical fiber connectors 850 are disposed on the computer system 840 and connect to an optical transceiver 860.

The system 500 may also be disposed within a computer system 840, as in FIG. 9. As shown in FIG. 9, the optical fiber 820 is fed through the system and connected to an optical fiber connector 850 which leads to an optical transceiver 860. The optical fiber 820 may also be connected directly to the optical transceiver 860. The system 500 is secured to a PCB 930 in the computer system 840, to ensure that the optical fiber 820 will not move due to external force. The system 500 may also be secured to a bracket in the computer system 840. The computer system 840 includes a RFID reader 910 connected to a baseboard management controller (BMC) 920. The RFID reader 910 will transfer information stored on the RFID tag 810 to the BMC 920, allowing users to view configurations remotely and without disassembling the computer system 840.

FIGS. 10-11 illustrate methods for optical signal filtering according to examples. One method 1000, as illustrated in FIG. 10, filters unwanted higher order optical signal modes using mandrels added to a base. In block 1002, a mandrel with an adjustable diameter is positioned on the base. The base includes a channel, a first member and second member. The channel may receive the mandrel in a plurality of positions relative to the axis of the base. The first member and the second member have an optical fiber retention mechanism. In block 1004, the position of the mandrel is modified. For example, the orientation of the mandrel may be changed from vertical to horizontal or from horizontal to vertical. In block 1006, the diameter of the mandrel is adjusted. The diameter may be increased or decreased.

A more detailed method 1100 of filtering unwanted higher order optical signal modes is illustrated in FIG. 11. After the steps in FIG. 10 1000, in block 1102, if optical fiber has not been fed through the first member, then in block 1104, optical fiber is inserted through an opening in the first member. In block 1106 the optical fiber is wrapped around the mandrel that was positioned on the base. In block 1108, the optical fiber is fed through the second member. If the unwanted higher order optical signal mode has not been filtered 1110, then another mandrel may be added 1002, the position may be modified 1004, and the diameter of the mandrel adjusted 1006. If another mandrel was added and optical fiber had already been fed through the first member 1102, then in block 1112, optical fiber is wrapped around the new mandrel. Rather than adding another mandrel, another alternative is to adjust the mandrels currently positioned on the base. This is done by adjusting the diameter of the mandrels further or adding more turns of the optical fiber to the mandrels positioned on the base. One more alternative would be to replace all the mandrels currently positioned on the base. The optical signal is checked again to ensure that the unwanted higher order optical signal mode is filtered 1110. If the unwanted higher order optical signal mode is filtered out, then the optical fiber is secured to the first member and second member via an optical fiber retention mechanism 1114. For example, a screw or some type of clamp may be used to secure the optical fiber. In block 1116, a protective covering may be added.

Although the flow diagram of FIGS. 10-11 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims

What is claimed is:

1. A system for optical signal filtering comprising:
   a mandrel with an adjustable diameter;
   a base including:
   a channel to receive the mandrel in a plurality of positions relative to an axis of the base;
   a first member and a second member extending from the base, at least one of the first member and the second member including a fiber retention mechanism; and
   a protective cover to enclose the mandrel.

2. The system of claim 1, wherein the protective cover includes an aperture to allow adjustment of the mandrel.

3. The system of claim 1, wherein the protective cover includes an embedded radio-frequency identification (RFID) tag wherein the embedded RFID tag is programmed to contain mandrel information including a number of mandrels on the base, a mandrel orientation for each mandrel on the base, a mandrel position for each mandrel on the base, a mandrel tuning or adjustment value for each mandrel on the base, and a mandrel diameter for each mandrel on the base.

4. A method for filtering out modes in optical signals comprising:
   positioning at least one mandrel with an adjustable diameter on a base, the base including:
   a channel to receive the at least one mandrel in a plurality of positions relative to an axis of the base, and
   a first member and a second member extending from the base, the first member and the second member including a fiber retention mechanism;
   modifying the position of the mandrel;
   adjusting a diameter of the mandrel; and
   inserting a fiber through an opening in the first member;
   wrapping the fiber around the mandrel; and
   feeding the fiber through the second member.

5. The method of claim 4, wherein a position of the mandrel is modifiable to be in a vertical or horizontal orientation relative to the base and wherein the mandrel can be placed at different lengths along the base.

6. The method of claim 4, wherein the position of the mandrel s modifiable at different lengths along the base.

* * * * *